US008326885B2

(12) United States Patent
Inokuchi et al.

(10) Patent No.: US 8,326,885 B2
(45) Date of Patent: Dec. 4, 2012

(54) FREQUENT CHANGING PATTERN EXTRACTION DEVICE

(75) Inventors: Akihiro Inokuchi, Osaka (JP); Takashi Washio, Osaka (JP)

(73) Assignee: Osaka University, Osaka (JP)

( * ) Notice: Subject to any disclaimer, the term of this patent is extended or adjusted under 35 U.S.C. 154(b) by 101 days.

(21) Appl. No.: 12/919,079

(22) PCT Filed: Jan. 13, 2009

(86) PCT No.: PCT/JP2009/000092
§ 371 (c)(1),
(2), (4) Date: Aug. 24, 2010

(87) PCT Pub. No.: WO2009/107315
PCT Pub. Date: Sep. 3, 2009

(65) Prior Publication Data
US 2011/0004631 A1      Jan. 6, 2011

(30) Foreign Application Priority Data
Feb. 26, 2008  (JP) .................................. 2008-044602

(51) Int. Cl.
*G06F 7/00* (2006.01)
*G06F 17/30* (2006.01)
(52) U.S. Cl. ...................................................... 707/798
(58) Field of Classification Search .................. 707/758, 707/796, 797, 798, 776
See application file for complete search history.

(56) References Cited

U.S. PATENT DOCUMENTS
8,112,440 B2 * 2/2012 Wu et al. ........................ 707/776
2010/0332476 A1 * 12/2010 Buehrer et al. ................ 707/737

OTHER PUBLICATIONS

Moti Cohen et al., Diagonally Subgraphs Pattern Mining, Jun. 13, 2004, ACM, 51-58.*
International Search Report issued Mar. 3, 2009 in International (PCT) Application No. PCT/JP2009/000092.
Akihiro Inoguchi et al., "*Tahindo Graph Mining (Generation for Frequent Subgraph Mining)*", Transactions of the Japanese Society for Artificial Intelligence, Sep. 1, 2004, vol. 19, No. 5B, pp. 368-378.
Tatsuya Asai et al., "*Hankozo Data Mining niokeru Pattern Hakken Giho (Algorithms for Mining Semistructured data)*",The Transactions of the Institute of Electronics, Information and Communication Engineers, Feb. 1, 2004, vol. J87-D-I, No. 2, pp. 79-96.

(Continued)

*Primary Examiner* — Jean B Fleurantin
(74) *Attorney, Agent, or Firm* — Wenderoth, Lind & Ponack, L.L.P.

(57) ABSTRACT

A frequent changing pattern extraction device which extracts a frequent changing pattern from an ever-changing network structure includes: a conversion unit which converts each of a plurality of graph sequences into an operator sequence by expressing changes, from a first graph included in the graph sequence to a second graph which is temporally adjacent to the first graph, using operators indicating operations necessary to transform the first graph into the second graph, each graph sequence including a plurality of graphs that show temporal changes in the graphs and each of the graphs including a vertex corresponding to a data piece and an edge corresponding to a link between data pieces; and an extraction unit which extracts an operator subsequence that appears at least a predetermined number of times in the plurality of operator sequences corresponding to the plurality of graph sequences, based on the anti-monotonicity used in the Apriori algorithm.

7 Claims, 13 Drawing Sheets

OTHER PUBLICATIONS

Takeaki Uno et al., "*Chino Computing to sono Shuhen [Dai 2 Kai] (Data Intensive Computing—No. 2 Frequent Itemset Mining Algorithms)*", Journal of the Japanese Society for Artificial Intelligence, May 1, 2007, vol. 22, No. 3, pp. 425-436.

Takeaki Uno et al., "*Rekkyo o Mochita Modeling no Shinten*", Operations Research as a Management Science Research, Apr. 1, 2007, vol. 52, No. 4, pp. 225-230.

R. Agrawal et al., "*Fast Algorithms for Mining Association Rules*", Proc. of Very Large Data Base, 1994, pp. 1-32.

A. Inokuchi et al., "*An Apriori-based Algorithm for Mining Frequent Substructures from Graph Data*", Proc. of European Conf. on Principles of Data Mining and Knowledge Discovery, Proc. PKDD2000, Sep. 13-16, 2000, Lyon, France, pp. 1-11.

A. Inokuchi et al., "*A Fast Algorithm for Mining Frequent Connected Subgraphs*", IBM Research Report, RT0448, Feb. 20, 2002.

M. Kuramochi et al. "*Frequent Subgraph Discovery*", the IEEE International Conference on Data Mining (ICDM), Dec. 2001.

M. Kuramochi et al., "*Finding Frequent Patterns in a Large Sparse Graph*", Proc. of SIAM Data Mining, Sep. 2003.

H. Motoda, "*Fascinated by Explicit Understanding*", Journal of the Japanese Society for Artificial Intelligence, vol. 14, No. 4, Jul. 1999, with partial English translation.

S. Nijssen et al. "*A Quickstart in Frequent Structure Mining can Make a Difference*", Proc. of Int'l Conf. on Knowledge Discovery and Data Mining, 2004.

J. Pei et al., "*PrefixSpan: Mining Sequential Patterns Efficiently by Prefix-Projected Pattern Growth*", Proc. of Int'l Conf. on Data Engineering, 2001.

T. Washio et al., "*State of Art of Graph-based Data Mining*", SIGKDD Explorations, vol. 5. No. 1, Jul. 2003.

X. Yan et al., "*gSpan: Graph-Based Substructure Pattern Mining*", Proc. of Int'l Conf. on Data Mining, 2002.

\* cited by examiner

FIG. 10

1) NativeChaingingGraphMiningUsingBFS(*DB*, $\sigma'$)
2)   *F* = {}
3)   Queue *q*
4)   *q.enqueue*(∅)
5)   repeat
6)     *s* = *q.dequeue*
7)     *C* = *expand*(*s*)
8)     forall *c* ∈ *C*
9)       if *c* is canonical
10)         if $\sigma(c) \geq \sigma'$
11)           *q.engure*(*c*)
12)         end
13)       end
14)     end
15)     Projection(*DB*, *s*, *F*, $\sigma'$)
16)   until *q* = ∅
17)   output *F*
18) end 1) Projection(*DB*, *s*, *F*, $\sigma'$)
2)   *DB'*(*s*) = {($tid_j$, $d'_j$) | ($tid_j$, $d_i$) ∈ *DB*,
      ($tid_j$, $d'_j$) ∈ *project*(($tid_j$, $d_i$), *s*)}
3)   *F* = *P* ∪ SequentialPatternMining
          (*DB'*(*s*), $\sigma'$, *s*)
4)   end

{R, Y, P}

{B, Y, G}

{R, B, Y, G}

{B, G}

FREQUENT CHANGING PATTERN EXTRACTION DEVICE

TECHNICAL FIELD

The present invention relates to data mining techniques used for graph-based data, and particularly to a frequent changing pattern extraction device which extracts, from a sequence of graphs having temporal changes, a pattern of change that frequently appears in the sequence.

BACKGROUND ART

In recent years, there has been an increase in studies on data mining which is used to discover useful or interesting patterns as knowledge from a massive amount of data. The usefulness varies from one person to another, and is thus difficult to define. However, in general, knowledge to explain many cases is considered to be useful (see Non-Patent Reference 6, for example). Ever since the Apriori algorithm was proposed in 1994, whereby frequent item sets are enumerated from data including plural item sets (see Non-Patent Reference 1, for example), frequent pattern enumeration algorithms have been proposed for various kinds of data structures. Recently, high-speed methods of enumerating frequent substructure patterns that appear in complex structures such as graphs have been proposed (see Non-Patent Reference 9, for example).

FIGS. 14 to 16 are diagrams for explaining one example of a method of enumerating frequent item sets using the Apriori algorithm. By using the Apriori algorithm, data combinations frequently appearing in plural data sets can be extracted at high speed, for example.

Consideration is given to the case where the data combinations which appear at least twice are to be extracted from four data sets, which are {R, Y, P}, {B, Y, G}, {R, B, Y, G}, and {B, G} as shown in FIG. 14. These data sets include five kinds of data pieces which are R, B, Y, P, and G. Thus, as the data combinations, there are: five kinds of data combinations each including one piece of data ($=_5C_1$); ten kinds of data combinations each including two pieces of data ($=_5C_2$); ten kinds of data combinations each including three pieces of data ($=_5C_3$); five kinds of data combinations each including four pieces of data ($=_5C_4$); and one kind of data combination including five pieces of data ($=_5C_5$). In total, there are 31 kinds of data combinations.

FIG. 15 is a diagram showing a search tree in which a vertex corresponds to a data combination. A vertex label shown in this diagram denotes the data combination as well as the number of data sets that include the present combination. For example, there are two data sets in which the data combination {R, Y} appears (namely, {R, Y, P} and {R, B, Y, G}). Thus, "$RY_2$" is described as the vertex label. In the diagram, the nearer the root, the fewer the number of data sets. Also, the nearer the leaves, the more the number of data sets. Regarding the vertices connected with edges, the number of data pieces included in the data combination of a child vertex is larger by one than the number of data pieces included in the data combination of a parent vertex. In the case where a search is to be performed in the search tree according to an exhaustive search algorithm, the number of appearances needs to be calculated for each of 31 data combinations.

FIG. 16 is a diagram for explaining a method of extracting a data combination which appears at least twice, according to the Apriori algorithm. First, the above-mentioned numbers of appearances are calculated for the combinations each including only one piece of data (namely, {R}, {B}, {Y}, {P}, and {G}). The results are twice, three times, three times, once, and three times, respectively. Since the number of appearances of the data combination {P} is one, each number of appearances of the other data combinations including the data combination {P} is fewer than twice. On account of this, the search does not need to be performed for the other data combinations including the data combination {P} (i.e., for descendant vertices of the vertex with the label $P_1$ in the search tree). Accordingly, the calculation of the numbers of appearances is terminated. Similarly, out of the data combinations each including two pieces of data, the data combinations {R, B} and {R, G} appear once. Therefore, the calculation of the numbers of appearances for the other data combinations including these data combinations is terminated as well. Thus, the data combinations which appear at least twice can be obtained at high speed. As described so far, according to the Apriori algorithm, a search for a pattern which is not expected to reach a goal is terminated and therefore a search for a frequent pattern can be made at high speed.

Targets of the graph mining have been mainly graphs which do not change over time.

Non-Patent Reference 1: R. Agrawal, R. Srikant, Fast Algorithms for Mining Association Rules in Large Databases, Proceedings of Very Large Data Base, pp. 487-499, 1994.

Non-Patent Reference 2: A. Inokuchi et. al., An Apriori-based Algorithm for Mining Frequent Substructures from Graph Data, Proceedings of European Conference on Principles of Data Mining and Knowledge Discovery, pp. 13-23, 2000.

Non-Patent Reference 3: Inokuchi, T. Washio, Y. Nishimura, & H. Motoda, A Fast Algorithm for Mining Frequent Connected Subgraphs, IBM Research Report, RT0448 February, 2002.

Non-Patent Reference 4: M. Kuramochi & G. Karypis, Frequent Subgraph Discovery, Proceedings of International Conference on Data Mining, pp. 313-320, 2001.

Non-Patent Reference 5: Kuramochi & G. Karypis, Finding Frequent Patterns in a Large Sparse Graph, Proceedings of SIAM Data Mining, 2004.

Non-Patent Reference 6: H. Motoda, Fascinated by Explicit Understanding, Journal of the Japanese Society for Artificial Intelligence, pp. 615-625, 1999.

Non-Patent Reference 7: S. Nijssen & J. Kok, A Quickstart in Frequent Structure Mining can Make a Difference, Proceedings of International Conference on Knowledge Discovery and Data Mining, pp. 647-652, 2004.

Non-Patent Reference 8: J. Pei, et. al., PrefixSpan: Mining Sequential Patterns by Prefix-Projected Growth, Proceedings of International Conference on Data Engineering, pp. 215-224, 2001.

Non-Patent Reference 9: T. Washio & H. Motoda, State of the Art of Graph-based Data Mining, SIGKDD Explorations, Vol. 5, No. 1, pp. 59-68, 2003.

Non-Patent Reference 10: X. Yan & J. Han, gSpan: Graph-Based Substructure Pattern Mining, Proceedings of International Conference on Data Mining, pp. 721-724, 2002.

SUMMARY OF THE INVENTION

Problems that Invention is to Solve

For example, in a human relation network represented by a graph as one expression, a person who is going to be a hub (a core or center) in the future does not act as a hub person since first participating in the network. This person is moving to a position to be a hub while the network structure is changing over time. Considering an entire graph as one community in the human relation network, the participation and withdrawal of persons respectively correspond to an increase and decrease in the number of vertices, and the changes caused by the resulting relations correspond to an increase or decrease in the number of edges. Similarly, a network structure configured by webpages changes its structure according to an increase or decrease in the number of webpages and hyperlinks over the course of a developmental process. Also, a gene network changes its network structure over the course of an evolutionary process including acquiring new genes, deleting genes, and mutating genes. A discussion thread can be considered as growth in a tree or directed acyclic graph where a new message causes a new vertex and a references to a previous comment causes an edge. Studies on changes in network structures as described above are believed to become one of the important subjects in the future.

According to a conventional method of enumerating substructure patterns at high speed, however, frequent changing patterns cannot be extracted from a network structure that changes from moment to moment because the processing targets of the conventional method are static data structures.

The present invention is conceived in view of the stated problem, and has an object to provide a frequent changing pattern extraction device which extracts a frequent changing pattern from a network structure that changes from moment to moment.

Means to Solve the Problems

In order to achieve the aforementioned object, the frequent changing pattern extraction device according to an aspect of the present invention is a frequent changing pattern extraction device including: a conversion unit which converts a graph sequence into an operator sequence by expressing changes, from a first graph included in the graph sequence to a second graph which is temporally adjacent to the first graph, using operators indicating operations necessary to transform the first graph into the second graph, the graph sequence including a plurality of graphs that show temporal changes in the graphs, and each of the graphs including a vertex corresponding to a data piece and an edge corresponding to a link between data pieces; and an extraction unit which extracts an operator subsequence that appears at least a predetermined number of times in the operator sequence, based on anti-monotonicity used in the Apriori algorithm.

To be more specific, the operations indicated by the operators include at least one of a vertex insertion, a vertex deletion, a vertex relabeling, an edge insertion, an edge deletion, and an edge relabeling.

With this configuration, changes in the graphs are expressed using the operators. Thus, the changes in the graphs (i.e., in the network structure) can be represented by the operator sequence. Based on the anti-monotonicity used in the Apriori algorithm, a frequent operator subsequence can be extracted. Since the operator sequence represents the changes in the graphs, a frequent pattern of change in the graphs can be extracted.

It is preferable that the stated frequent changing pattern extraction device further includes a sequence-for-union-graph generation unit which generates an operator sequence corresponding to a union graph obtained by removing a vertex that is not connected to another vertex from a graph configured by a union of vertices and a union of edges of the plurality of graphs included in the graph sequence, wherein the extraction unit extracts an operator subsequence that appears at least a predetermined number of times in the operator sequence generated by the sequence-for-union-graph generation unit, based on the anti-monotonicity used in the Apriori algorithm.

A graph which is not connected to a union graph is considered difficult for people to interpret. On account of this, a graph which is not connected to a union graph is removed, so that only the operator sequences included in the union graph become the targets in the processing. As a result, only operator subsequences (the patterns of change in the graphs) which are useful to people can be accordingly extracted. Moreover, the number of operator sequences to be evaluated by the extraction unit can be reduced, and therefore the processing can be performed at high speed.

Also, it is preferable that the stated frequent changing pattern extraction device further includes an order changing unit which changes an order in which the operators included in the operator sequence converted by the conversion unit are arranged, so that the temporal changes in the graphs expressed by a resulting operator sequence are represented by vertices that increase in number over time, wherein the extraction unit extracts an operator subsequence that appears at least a predetermined number of times in the operator sequence obtained as a result of the order change executed by the order changing unit, based on the anti-monotonicity used in the Apriori algorithm.

By changing the order in which the operators are applied, it becomes easier to apply the anti-monotonicity used in the Apriori algorithm.

It should be noted that the present invention can be implemented not only as the frequent changing pattern extraction device including the characteristic units as described above, but also as: a frequent changing pattern extraction method having, as steps, the characteristic units included in the frequent changing pattern extraction device; and a program causing a computer to execute the characteristic steps included in the frequent changing pattern extraction method. In addition, it should be understood that such a program can be distributed via a recording medium such as a CD-ROM (Compact Disc-Read Only Memory) or a communication network such as the Internet.

Effects of the Invention

The present invention can provide a frequent changing pattern extraction device which extracts a frequent changing pattern from a network structure that changes from moment to moment.

BRIEF DESCRIPTION OF DRAWINGS

FIG. 10 is a diagram showing pseudo-codes of a method according to the breadth-first search algorithm.

NUMERICAL REFERENCES

Figure 1:
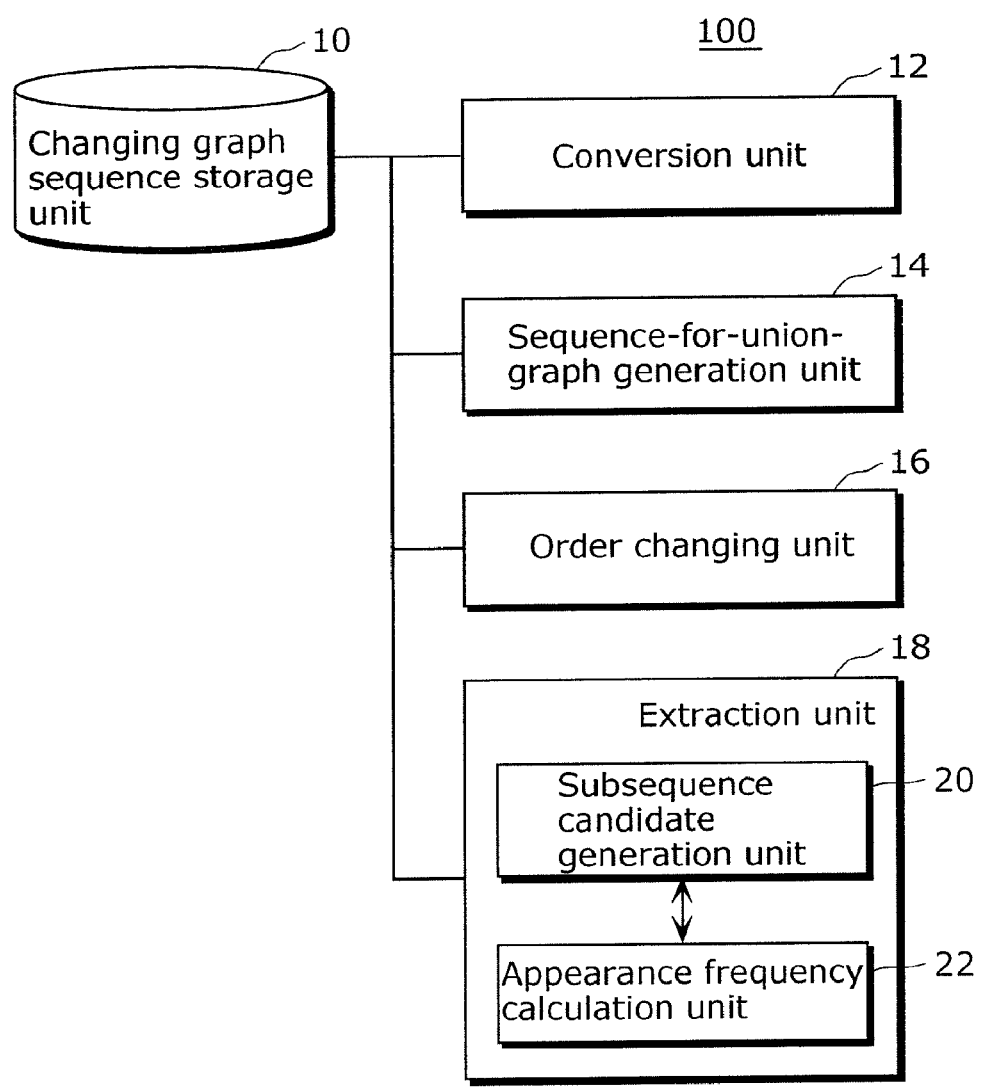
FIG. 1 is a block diagram showing a functional configuration of a frequent changing pattern extraction device in an embodiment of the present invention.

10 Changing graph sequence storage unit
12 Conversion unit
14 Sequence-for-union-graph generation unit
16 Order changing unit
18 Extraction unit
20 Subsequence candidate generation unit
22 Appearance frequency calculation unit
33, 34, 35 Vertex
100 Frequent changing pattern extraction device

DETAILED DESCRIPTION OF THE INVENTION

The present invention proposes a method of efficiently enumerating frequent changing patterns buried in data of graph sequences that change over time, based on a graph mining technique.

A graph change, mentioned as a target of the present invention, refers to a structural change caused as a result of an increase or decrease in the number of vertices or edges. Information travelling across a network (namely, a graph) and a distance between vertices are also important elements as causes of the structural changes. However, in order to simplify the problem, the present invention is discussed, with attention being focused only on graph structures.

The following is a description of a frequent changing pattern extraction device according to an embodiment of the present invention, with reference to the drawings.

FIG. 1 is a block diagram showing a functional configuration of a frequent changing pattern extraction device according to the embodiment of the present invention.

A frequent changing pattern extraction device 100 is a device which extracts a frequent changing pattern from a graph sequence that changes over time. The frequent changing pattern extraction device 100 includes a changing graph sequence storage unit 10, a conversion unit 12, a sequence-for-union-graph generation unit 14, an order changing unit 16, an extraction unit 18, a subsequence candidate generation unit 20, and an appearance frequency calculation unit 22. The frequent changing pattern extraction device 100 is configured by a computer, and the changing graph sequence storage unit 10 is configured by a memory of the computer or an external storage device such as a hard disk. Processes performed by the other processing units are implemented by causing a CPU of the computer to execute programs. It should be noted that intermediate results given by the processing units are stored in memory of the computer. Also note that a processing result is displayed on a not-illustrated display device of the computer.

The changing graph sequence storage unit 10 is a storage device which stores a plurality of graph sequences, each graph sequence including a plurality of graphs that show temporal changes in the graphs, and each of the graphs including a vertex corresponding to a data piece and an edge corresponding to a link between data pieces.

The conversion unit 12 is a processing unit which converts each of the graph sequences stored in the changing graph sequence storage unit 10 into an operator sequence by expressing changes, from a first graph included in the graph sequence to a second graph which is temporally adjacent to the first graph, using operators indicating operations necessary to transform the first graph into the second graph.

The sequence-for-union-graph generation unit 14 is a processing unit which generates, for each operator sequence of the graph sequence, another operator sequence corresponding to a union graph obtained by removing a vertex that is not connected to another vertex from a graph configured by a union of vertices and a union of edges of the plurality of graphs included in the graph sequence.

The order changing unit 16 is a processing unit which, for each operator sequence generated by the sequence-for-union-graph generation unit 14, changes the order in which the operators included in the operator sequence are arranged, so that the temporal changes in the graphs expressed by the operator sequence are represented by the vertices that increase in number over time.

The extraction unit 18 is a processing unit which extracts an operator subsequence that appears at least a predetermined number of times in the plurality of operator sequences corresponding to the plurality of graph sequences, based on the anti-monotonicity used in the Apriori algorithm. The extraction unit 18 includes the subsequence candidate generation unit 20 and the appearance frequency calculation unit 22.

The subsequence candidate generation unit 20 is a processing unit which generates operator subsequence candidates while increasing the number of included operators by one each time.

The appearance frequency calculation unit 22 is a processing unit which calculates the number of times the operator subsequence candidate appears in the plurality of operator sequences.

It should be noted that the subsequence candidate generation unit 20 increases the number of operators by one for only an operator subsequence candidate, out of the operator subsequence candidates, whose number of appearances calculated by the appearance frequency calculation unit 22 is the predetermined number of times or more, so as to update the operator subsequence candidates.

The processing performed by the frequent changing pattern extraction device 100 configured as described above is explained below.

<1. Problem Definition>

Figure 2:
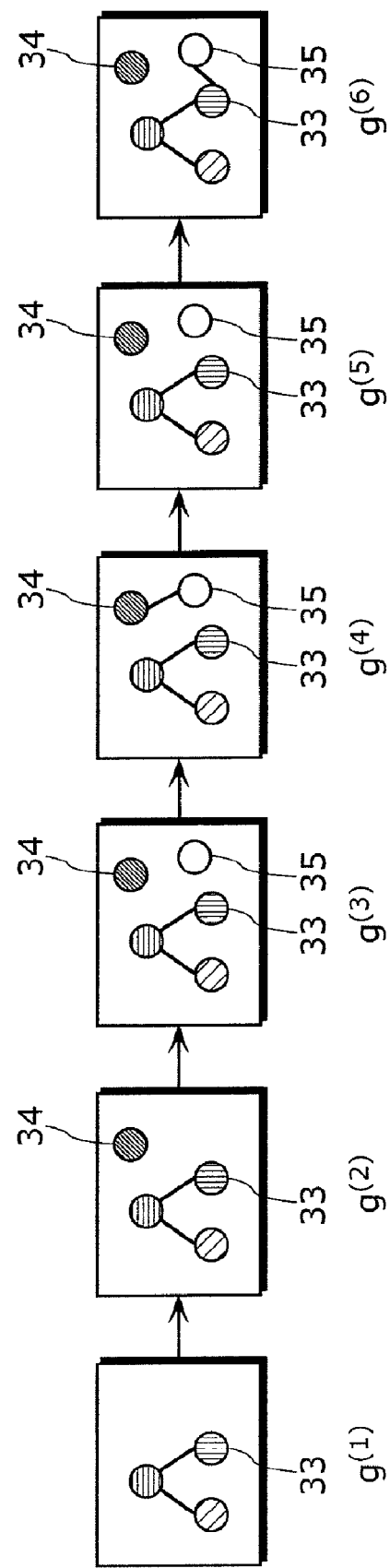
FIG. 2 is a diagram showing an example of a graph sequence.

FIG. 2 is a diagram showing an example of a changing graph sequence stored in the changing graph sequence storage unit 10. In the diagram, $g^{(t)}$ denotes a t-th graph in the sequence and each $g^{(t)}$ is a labeled graph. An object of the present invention is to propose an algorithm for enumerating frequent changing patterns from such a changing graph sequence. In order to achieve this object, a first problem is how to concisely express changes in the graphs and, at the same time, to minimize a search space by reducing the variety of possible expressions. In FIG. 2, $g^{(1)}$ and $g^{(2)}$ have the substructure configured by three vertices in common. With this being the case, holding information of all vertices and all edges for each t does not lead to a concise expression. To address this problem in the present invention, consideration is given to the case where a changing graph sequence is expressed using a description based on a difference between $g^{(t)}$ and $g^{(t+1)}$.

Figure 3:
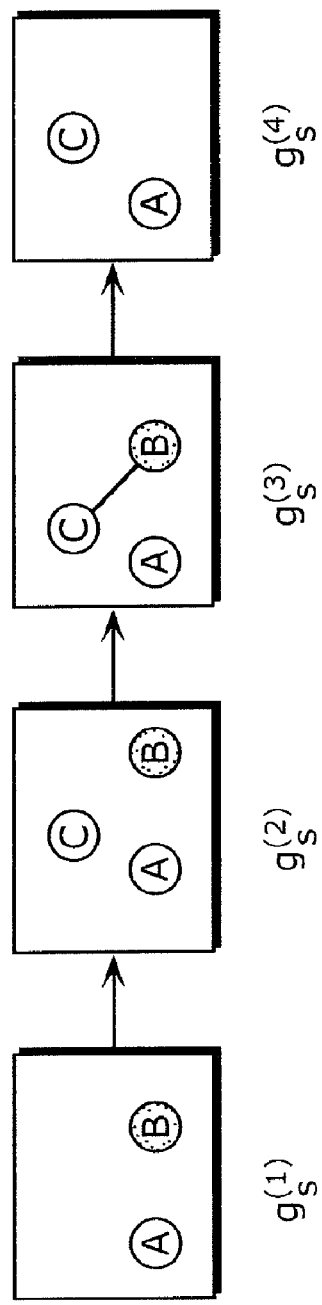
FIG. 3 is a diagram showing an example of an unreadable pattern.

A second problem is to search for a pattern p with what kind of characteristics, the pattern being expressed as $p=<g_s^{(1)} \ldots g_s^{(m)}>$. For example, when the graph sequence is searched without constraints on each graph $g_s^{(t)}$, an enormous number of patterns become subjects of the search. Also, an output pattern may not be always interpretable. In the case where a disconnected graph is allowed as $g_s^{(t)}$, for instance, a pattern as shown in FIG. 3 may be outputted. Let the pattern shown in FIG. 3 be a network structure of webpages. In this case, the shown pattern is a subsequence that can exist everywhere, such as a structure where vertices B and C correspond to webpages of Washio Laboratory whereas a vertex A corresponds to a webpage of an organization in Brazil. Thus, it is highly possible for this pattern to be extracted as a frequent pattern. However, since there is no association between A and B, such a pattern is usually difficult to interpret and thus may fall outside people's interest. On the other hand, under the constraint that each graph at t is connected, a pattern such as the one shown in FIG. 2 is not searched for. However, although vertices 33 and 34 are not connected in each graph at t, these vertices are thought to be associated in some way with each other via a vertex 35. On this account, such a pattern as shown in FIG. 2 is desired to be a search target. In terms of versatility, it is better for a search-target pattern to have fewer constraints. As described thus far, patterns to be search targets are not obvious due to the problem as mentioned in the present invention. Accordingly, the definition of patterns is discussed as well.

A labeled graph g is defined as g=(V, E, L, f). Here, V represents a set of vertices and is expressed as $V=\{v_1, v_2, \ldots, v_n\}$.

$$E=\{(v_i, v_j)|(v_i,v_j) \in V \times V\} \quad \text{[Math. 1]}$$

In the above, E represents a set of edges. L represents a set of labels.

$$f:(V \cup E \to L) \quad \text{[Math. 2]}$$

Also, f is expressed as above. In the present invention, undirected graphs are discussed according to a proposed method. However, the present invention is applicable to directed graphs. Suppose here that the graph g and the graph $g_s$ expressed as $g_s=(V_s, E_s, L_s, f)$ satisfy the following equations.

[Math. 3]

$$\forall v_i \in V_s, f(v_i)=f(\phi(v_i)), \quad 1.$$

$$\forall (v_i, v_j) \in E_s, f(v_i, v_j)=f(\phi(v_i), \phi(v_j)), \quad 2.$$

When such a function $\phi$ exists, $g_s$ is referred to as a subgraph of g and expressed as follows.

$$g_s \sqsubseteq g \quad \text{[Math. 4]}$$

A set of edges connecting from a vertex $v_i$ to a vertex $v_j$ is called a path. When a path is present between any two vertices of a graph, this graph is called a connected graph. A graph sequence is expressed as $d=<g^{(1)} g^{(2)} \ldots g^{(n)}>$. The object of the present invention is to provide a method of searching for and finding a frequent sequence $p=<g_s^{(1)} g_s^{(2)} \ldots g_s^{(m)}>$ when the graph sequence d is given as an input. Here, the following expression is given in the case where $1 \leq j_1 < j_2 \ldots < j_m \leq n$.

$$g_s^{(1)} \sqsubseteq g^{(j1)}, g_s^{(2)} \sqsubseteq g^{(j2)}, \ldots, g_s^{(m)} \sqsubseteq g^{(jm)} \quad \text{[Math. 5]}$$

Here, p is described as follows.

$$p \sqsubseteq d \quad \text{[Math. 6]}$$

EXAMPLE 1

A network of webpages has a graph structure where a vertex corresponds to a webpage and an edge corresponds to a hyperlink, for example. The graph structure changes whenever an edit is performed. For instance, $g^{(t)}$ has a graph structure in the t-th phase of a certain website. Although each page may be considered to be unlabeled, it may also be considered to be labeled such as "Webpage of University", "Webpage of Financial Company", or "Webpage of Manufacturing Company". A label is set according to the intention of analysis, and is not specifically designated in the present invention.

A union graph is defined in order to discuss what kind of pattern is to be searched for. Each vertex $v_i$ of a graph has a unique ID id $(v_i)$ that does not change over time. In the aforementioned examples of webpages, URLs correspond to the unique IDs. When a set of graphs expressed as $\{g_1, \ldots, g_n\}$ is given, Math. 7 described below is defined by Math. 8 as follows.

$$G=\cup_i g_i \quad \text{[Math. 7]}$$

$$V(G)=\cup_i \{id(v)|v \in V(g_i)\}$$

$$E(G)=\cup_i \{(id(v_1), id(v_2))|(v_1, v_2) \in E(g_i)\} \quad \text{[Math. 8]}$$

Here, V $(g_i)$ and E $(g_i)$ represent a set of vertices and a set of edges of the graph $g_i$, respectively.

$$\cup_i g_i \quad \text{[Math. 9]}$$

The number of vertices in the above expression is the cardinality of the unique IDs of the vertices of $\{g_1, \ldots, g_n\}$. According to the definition as described, a target pattern in the present invention can be defined as follows. Suppose that a pattern is expressed as $p=<g_s^{(1)} g_s^{(2)} \ldots g_s^{(m)}>$.

Here, a search is made for a graph sequence p where the following is connected.

$$\cup_{i=1, \ldots, m} g_s^{(i)} \quad \text{[Math. 10]}$$

Note that the vertices included in the graph sequence p that satisfies this condition are "associated with each other". Although each $g_s^{(i)}$ appearing in the pattern may be disconnected, any two vertices in the pattern are associated with each other within a target phase. Hence, each output pattern is readable (i.e., interpretable), which does not violate the aforementioned object.

Documents (see Non-Patent Reference 5, for example) have proposed the SIGRAM algorithm whereby frequent subgraphs are mined from a huge graph that does not change over time. Although the SIGRAM algorithm proposes a frequency counting method, the FSG algorithm that is an existing graph mining method (see Non-Patent reference 4, for example) is employed as the pattern enumeration method. In other words, the pattern enumeration method and the frequency counting method can be separately defined, and the same can be said for the problem to be addressed by the present invention. On the account of this, the present invention focuses on a pattern enumeration method and accordingly proposes an efficient enumeration method. Suppose that an input database DB is a collection of graph sequences $d_i$ and data identifiers $tid_i$, and is expressed as $DB=\{(tid_i, d_i)|d_i=<g_i^{(1)} g_i^{(2)} \ldots g_i^{(ti)}>\}$. For such a database, the support is defined as follows.

$$\sigma(p)=|\{tid_i|(tid_i, d_i) \in DB, p \sqsubseteq d_i\}|/|DB| \quad \text{[Math. 11]}$$

A pattern having a specified support threshold σ' or higher is referred to as a frequent pattern.

Next, a first problem of pattern enumeration is explained.
<Pattern Enumeration Problem 1 (Simple Problem)>
Suppose that a collection of graph sequences expressed as $DB=\{(tid_i, d_i)|d_i=<g_i^{(1)} \ldots g_i^{(ti)}>\}$ and σ' are given as inputs.

In this case, the problem is to enumerate each frequent pattern p expressed as p=<$g_s^{(1)} \ldots g_s^{(m)}$>, where the following is connected.

$$\cup_i g_s^{(i)} \quad [\text{Math. 12}]$$

Each graph $g_s^{(t)}$ included in the graph sequence as a pattern is not always connected. The simplest method as the pattern enumeration algorithm is: to activate the frequent subgraph enumeration algorithm whereby disconnected graphs are also outputted; to perform the existing sequential pattern mining, with each frequent subgraph being an item; and then to remove a pattern whose union graph is not connected, in the post-processing. However, this method is inefficient because patterns that do not satisfy the condition that the union graph of the pattern is connected are obtained in large numbers immediately before the post-processing.

Also, consider a method of expanding the pattern by adding an item $i_k$ one at a time in the temporal order, as in the case of a conventional sequential pattern mining (see Non-Patent Reference 8, for example). When a pattern desired to be extracted is $i_1\ i_2\ (i_2\ i_3)\ i_4$, the pattern is expanded in order as follows: $i_1$; $i_1\ i_2$; $i_1\ i_2\ (i_2)$; $i_1\ i_2\ (i_2\ i_3)$; and $i_1\ i_2\ (i_2\ i_3)\ i_4$. A new item always has to be appended to the item that occurs most recently in the temporal order. However, in the case where an analysis target is a graph and it is known in advance that the pattern shown in FIG. 2 is one of frequent patterns, $g_s^{(2)}$ can be generated by adding a darkest-shaded vertex to $g_s^{(1)}$ of FIG. 2. On the other hand, when <$g_s^{(1)}\ g_s^{(2)}$> is frequent and <$g_s^{(1)}\ g_s^{(2)}\ g_s^{(3)}$> is infrequent, it is useless and inefficient to add the darkest-shaded vertex. The search is performed in a state where frequent patterns are unknown in advance. Hence, an efficient search method is necessary to achieve the aforementioned object.

Regarding relevance to the problem of the existing frequent subgraph mining, when each $t_i$ of Pattern Enumeration Problem 1 is 1, this is the same problem addressed by the algorithms of AcGM (see Non-Patent Reference 3, for example), FSG (see Non-Patent Reference 4, for example), and gSpan (see Non-Patent Reference 10, for example). Moreover, when $t_i=1$, the constraint on the union graph is canceled, and a constraint that to-be-extracted patterns are included as induced subgraphs in the graphs of the database is imposed, this is the same problem addressed by the AGM algorithm (see Non-Patent Reference 2, for example).

<2. Graph Transformation Operators>

The conversion unit 12 holds only differences between $g^{(t)}$ and $g^{(t+1)}$ using one of the methods of determining graph edit distances, in order to express changes in the graphs. To be more specific, the degree of similarity between two graphs is determined according to the smallest number of times in which insertion, deletion, relabeling of vertices and edges are applied recursively until the two graphs become identical. Operators used for performing six kinds of operations shown in Table 1 are referred to as transformation operators.

TABLE 1

| | Graph Transformation Operators | | |
|---|---|---|---|
| Vertex insertion | $OP_{[vi, i, l]}^{(t)} g^{(t)}$ | Vertex with label l is inserted to g(t). Unique ID of the inserted vertex is i. The inserted vertex has no edges. | |
| Vertex deletion | $OP_{[vd, i, l]}^{(t)} g^{(t)}$ | Vertex with unique ID i is deleted from $g^{(t)}$. Only isolated vertices are targets. When deleting a non-isolated vertex, $OP_{[ed, (i,j), l]}^{(t)}$ is applied a few times in advance. | |
| Vertex relabeling | $OP_{[vr, i, l]}^{(t)} g^{(t)}$ | Vertex label with unique ID i is relabeled to l. | |
| Edge insertion | $OP_{[ei, (i,j), l]}^{(t)} g^{(t)}$ | Edge with label l is inserted between vertices with unique IDs i and j in $g^{(t)}$. | |
| Edge deletion | $OP_{[ed, (i,j), l]}^{(t)} g^{(t)}$ | Edge between vertices with unique IDs i and j is deleted from $g^{(t)}$, l being the label of the to-be-deleted edge. | |
| Edge relabeling | $OP_{[er, (i,j), l]}^{(t)} g^{(t)}$ | Label of the edge between vertices with unique IDs i and j is relabeled to l. | |

Holding differences between $g^{(1)}$ and the subsequent graphs is one way. However, considering that $g^{(0)}$ has no vertices, data including a difference between $g^{(0)}$ and $g^{(1)}$ is held so as to process the data uniformly. Hereafter, $g^{(0)}$ is expressed as follows.

$$\perp \quad [\text{Math. 13}]$$

Even in the case where each graph is relatively large, data can be concisely held if the changing parts are small in number.

EXAMPLE 2

Figure 4:
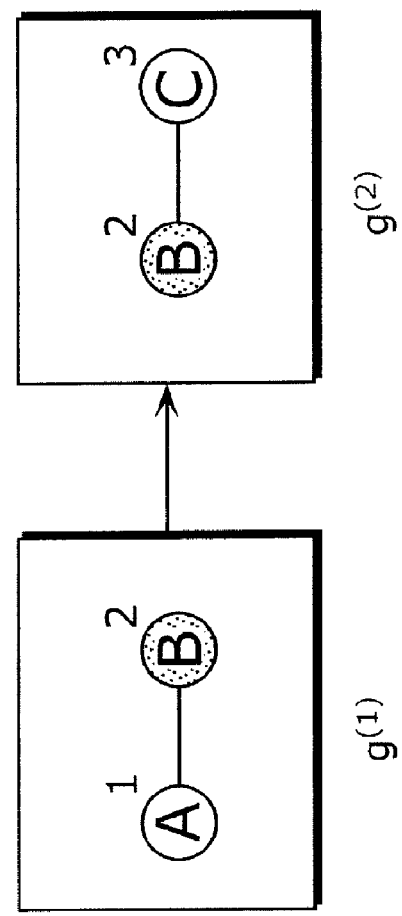
FIG. 4 is a diagram showing a part of an input sequence.
Figure 5:
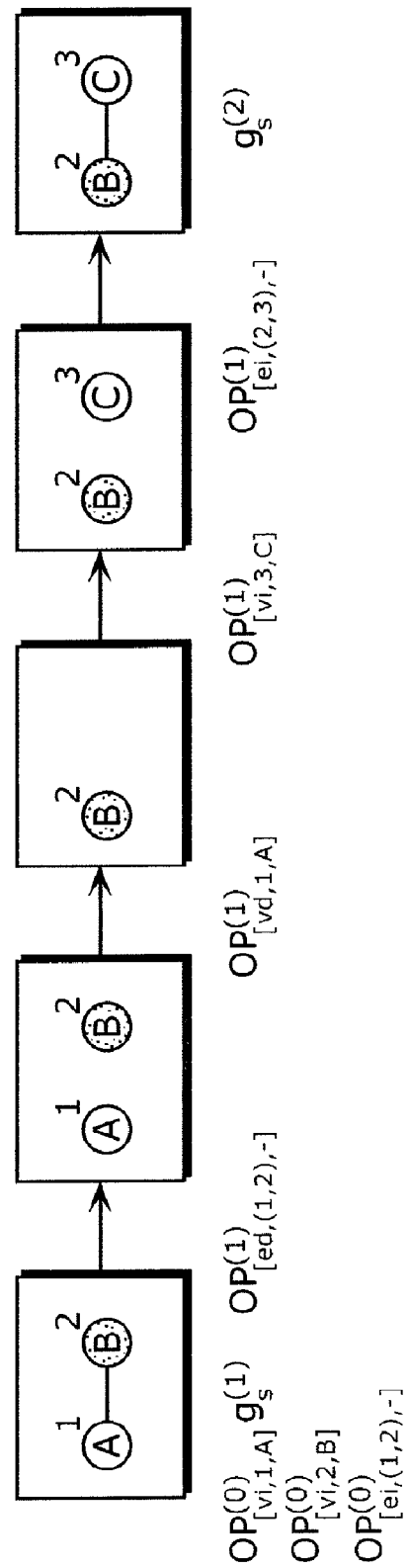
FIG. 5 is a diagram showing an example of a sequence expressed using graph transformation operators.

A sequence shown in FIG. 4 is considered, for instance. The sequence shown in FIG. 4 can be expressed by a sequence of insertions and deletions of vertices and edges as shown in FIG. 5. A numerical superscript assigned to each individual vertex represents the unique ID of the vertex. Here, the changes in the graphs can be expressed as follows.

$$g^{(2)} = OP_{[ei,(1,2),-]}^{(1)} OP_{[vi,3,C]}^{(1)} OP_{[vd,1,A]}^{(1)}$$
$$OP_{[ed,(1,2),-]}^{(1)} OP_{[ei,(1,2),-]}^{(0)} OP_{[vi,2,C]}^{(0)} OP_{[vi,1,A]}^{(0)} \perp \quad [\text{Math. 14}]$$

When the data $d_j$ in the database is expressed as $di=$<$g_i^{(1)}\ g_i^{(2)} \ldots g_i^{(n)}$>, this expression is referred to as the graph sequence representation.

$$g^{(n)} = OP_{[*, o_k, l_k]}^{(n-1)} \ldots OP_{[*, o_1, l_1]}^{(0)} OP_{[*, o_0, l_0]}^{(0)} \perp \quad [\text{Math. 15}]$$

When expressed as the above, this expression is referred to as the transformation operator representation.

$$\langle OP_{[*, o_0, l_0]}^{(0)} \ldots OP_{[*, o_k, l_k]}^{(n-1)} \rangle \quad [\text{Math. 16}]$$

When expressed as the above, this expression is referred to as the transformation operator sequence representation. Suppose that an operator expressed as below is included in s of the transformation operator sequence representation.

$$OP_{[*, o, l]}^{(t)} \quad [\text{Math. 17}]$$

In this case, the following expression is given.

$$OP_{[*, o, l]}^{(t)} \in s \quad [\text{Math. 18}]$$

Also, the transformation operator sequence representation corresponding to d in the graph sequence representation is described as seq (d).

Transformation Operator Sequence Representation

A sequence s' that is generated by removing some operators from the following expression is referred to as a subsequence of s.

$$\langle OP_{[*, o_0, l_0]}^{(0)} \ldots OP_{[*, o_{n-1}, l_{n-1}]}^{(n-1)} \rangle \quad [\text{Math. 19}]$$

Also, the sequence s' is expressed as follows.

$$s' \sqsubseteq s \quad \text{[Math. 20]}$$

The sequence s' is a subsequence of the sequence s. Let their correspondence relation be expressed using $\phi$, for the following.

$$OP_{[*, o, l]}^{(t)} \in s, OP_{[*, o', l']}^{(t')} \in s' \quad \text{[Math. 21]}$$

In this case, the correspondence relation is expressed as below.

$$OP_{[*, o, l]}^{(t)} = \phi(OP_{[*, o', l']}^{(t')}) \quad \text{[Math. 22]}$$

<Assumption 1> A transformation operator is generated according to the shortest edit distance between $g^{(t)}$ and $g^{(t+1)}$. Suppose that the following expressions in Math. 23 and Math. 24 are included in one transformation operator representation.

$$OP_{[vi, o_1, l]}^{(t1)} \quad \text{[Math. 23]}$$

$$OP_{[vd, o_2, l]}^{(t2)} \quad \text{[Math. 24]}$$

Here, note that there is no value combination expressed as $t1=t2$ and $o1=o2$, whereby a vertex is inserted and then immediately deleted.

Transformation Operator Sequence Representation $$s = \langle OP_{[*, o_1, l_1]}^{(0)} \ldots OP_{[*, o_k, l_k]}^{(n-1)} \rangle \quad \text{[Math. 25]}$$

When the above equation is given, a union graph G of s expressed as G=(V, E) is defined as follows.

$$V(G) = \{o | OP_{[q, o, l]}^{(t)} \in s, q \in \{vi, vd, vr\}\}$$

$$E(G) = \{o | OP_{[q, o, l]}^{(t)} \in s, q \in \{ei, ed, er\}\} \quad \text{[Math. 26]}$$

Also, for $DB = \{(tid_i, d_i) | d_i = \langle g_i^{(1)} \ldots g_i^{(ti)} \rangle\}$, the support of the pattern s in the transformation operator sequence representation is expressed as follows.

$$\sigma(s) = |\{tid_i | (tid_i, d_i) \in DB, s \sqsubseteq seq(d_i)\}| / |DB| \quad \text{[Math. 27]}$$

The union graph G is generated by the sequence-for-union-graph generation unit 14.

<Pattern Enumeration Problem 2 (Extended Problem)>

Suppose that a collection of graph sequences expressed as $DB = \{(tid_i, d_i) | d_i = \langle g_i^{(1)} \ldots g_i^{(ti)} \rangle\}$ and $\sigma'$ are given as inputs. In this case, the problem is to enumerate each frequent pattern expressed below in the transformation operator sequence representation, where the union graph is connected.

$$\langle OP_{[*, o_1, l_1]}^{(0)} \ldots OP_{[*, o_k, l_k]}^{(n-1)} \rangle \quad \text{[Math. 28]}$$

This processing is executed by the extraction unit 18.

<Theorem 1> The support has the anti-monotonicity property with respect to a sequence length of the pattern.

<Theorem 2> Suppose that a collection of graph data sequences expressed as $DB = \{(tid_i, d_i) | d_i = \langle g_i^{(1)} \ldots g_i^{(ti)} \rangle\}$ and $\sigma'$ are given as inputs. Here, let sets of all the patterns outputted in Pattern Enumeration Problems 1 and 2 be $P_1$ and $P_2$, respectively. In this case, the following expression is derived.

$$P_1 \subseteq P_2 \quad \text{[Math. 29]}$$

As described above, the object in the present invention is to mine a pattern which is readable and has fewer constraints (namely, a versatile pattern). According to the definition of the union graph in the transformation operator sequence representation, when the union graph in the transformation operator sequence representation is connected, it can be said that the two vertices $v_i$ and $v_j$ in the transformation operator sequence representation are associated with each other. Hence, the patterns outputted in Pattern Enumeration Problem 2 are readable. Although the proof is omitted due to space limitation, it is considered that, according to Theorem 2, the patterns outputted in Pattern Enumeration Problem 1 can be outputted by imposing (i.e., increasing) constraints on the patterns outputted in Pattern Enumeration Problem 2. Hereafter, a discussion is made on Pattern Enumeration Problem 2.

When the operations OPs were defined above, the order in which the operations are applied was not discussed in detail. In the following, commutative properties of the operators are described. Similarly, the properties including relabeling can be defined, although omitted here due to space limitation. The following explanation is given based on the assumption that $t < t' < t''$. It should be noted that the order of operators is changed by the order changing unit 16.

<Vertex Insertion→Vertex Insertion>

Consideration is given to the case where vertices with the unique IDs i and j are to be inserted. Suppose that the vertex with the unique ID i is first inserted and then the vertex with the unique ID j is inserted into the graph g (t), so that a graph $g^{(t'')}$ is generated. Here, if the order of insertions is changed as follows, an isomorphic graph $g^{(t'')}$ is generated.

$$g^{(t'')} = OP_{[vi, j, l_2]}^{(t')} OP_{[vi, i, l_1]}^{(t)} g^{(t)} \Rightarrow$$

$$g^{(t'')} = OP_{[vi, i, l_1]}^{(t)} OP_{[vi, j, l_2]}^{(t')} g^{(t)} \quad \text{[Math. 30]}$$

<Vertex Insertion→Vertex Deletion>

Consideration is given to the case where the vertex with the unique ID i is first inserted and then the vertex with the unique ID j is deleted. When $i \neq j$ and the graph $g^{(t'')}$ is generated according to this operation, the isomorphic graph $g^{(t'')}$ is generated even if the order of insertion is changed as follows. On the other hand, when $i=j$, the order cannot be changed because the inserted vertex is to be deleted.

$$\begin{array}{l} \text{if } i \neq j \\ \left(\begin{array}{c} \text{that is, if the inserted vertex is not to be} \\ \text{deleted} \end{array}\right) \\ g^{(t'')} = OP_{[vd, j, l_2]}^{(t')} OP_{[vi, i, l_1]}^{(t)} g^{(t)} \Rightarrow \\ g^{(t'')} = OP_{[vi, i, l_1]}^{(t)} OP_{[vd, j, l_2]}^{(t')} g^{(t)} \\ \text{else inapplicable} \end{array} \quad \text{[Math. 31]}$$

<Vertex Deletion→Vertex Insertion>

The vertex with the unique ID i is first deleted and then the vertex with the unique ID j is inserted. Since the vertex to be deleted is selected from among the vertices with the unique IDs other than i, the order can be changed.

$$g^{(t'')} = OP_{[vi, j, l_2]}^{(t')} OP_{[vd, i, l_1]}^{(t)} g^{(t)} \Rightarrow$$

$$g^{(t'')} = OP_{[vd, i, l_1]}^{(t)} OP_{[vi, j, l_2]}^{(t')} g^{(t)} \quad \text{[Math. 32]}$$

An edge insertion is expressed as follows.

$$OP_{[ei, (i,j), l]}^{(t)} \quad \text{[Math. 33]}$$

An edge deletion is expressed as follows.

$$OP_{[ed, (i,j), l]}^{(t)} \quad \text{[Math. 34]}$$

In the present embodiment, the edge change is expressed as follows.

$$OP_{[e,(i,j),l]}^{(t)} \quad [\text{Math. 35}]$$

if $i \neq j$ and $i \neq k$ [Math. 36]

(that is, if an edge of the inserted vertex is not to be inserted or deleted)

$$g^{(t'')} = OP_{[e,(j,k),l_2]}^{(t')} OP_{[vi,i,l_1]}^{(t)} g^{(t)} \Rightarrow$$

$$g^{(t'')} = OP_{[vi,i,l_1]}^{(t)} OP_{[e,(j,k),l_2]}^{(t')} g^{(t)}$$

else inapplicable

<Edge Change→Vertex Insertion>

$$g^{(t'')} = OP_{[vi,k,l_2]}^{(t')} OP_{[e,(i,j),l_1]}^{(t)} g^{(t)} \Rightarrow \quad [\text{Math. 37}]$$

$$g^{(t'')} = OP_{[e,(i,j),l_1]}^{(t)} OP_{[vi,k,l_2]}^{(t')} g^{(t)}$$

<Vertex Deletion→Vertex Deletion>

$$g^{(t'')} = OP_{[vd,j,l_2]}^{(t')} OP_{[vd,i,l_1]}^{(t)} g^{(t)} \Rightarrow \quad [\text{Math. 38}]$$

$$g^{(t'')} = OP_{[vd,i,l_1]}^{(t)} OP_{[vd,j,l_2]}^{(t')} g^{(t)}$$

<Vertex Deletion→Edge Change>

$$g^{(t'')} = OP_{[e,(j,k),l_2]}^{(t')} OP_{[vd,i,l_1]}^{(t)} g^{(t)} \Rightarrow \quad [\text{Math. 39}]$$

$$g^{(t'')} = OP_{[vd,i,l_1]}^{(t)} OP_{[e,(j,k),l_2]}^{(t')} g^{(t)}$$

<Edge Change→Vertex Deletion> if $i \neq j$ and $i \neq k$ [Math. 40]

(that is, if an edge of the inserted vertex is not to be changed)

$$g^{(t'')} = OP_{[vd,k,l_2]}^{(t')} OP_{[e,(i,j),l_1]}^{(t)} g^{(t)} \Rightarrow$$

$$g^{(t'')} = OP_{[e,(i,j),l_1]}^{(t)} OP_{[vd,k,l_2]}^{(t')} g^{(t)}$$

else inapplicable

<Edge Change→Edge Change>

$$g^{(t'')} = OP_{[e,(k,h),l_2]}^{(t')} OP_{[e,(i,j),l_1]}^{(t)} g^{(t)} \Rightarrow \quad [\text{Math. 41}]$$

$$g^{(t'')} = OP_{[e,(i,j),l_1]}^{(t)} OP_{[e,(k,h),l_2]}^{(t')} g^{(t)}$$

<3. Pattern Enumeration Algorithm>

Figure 6:
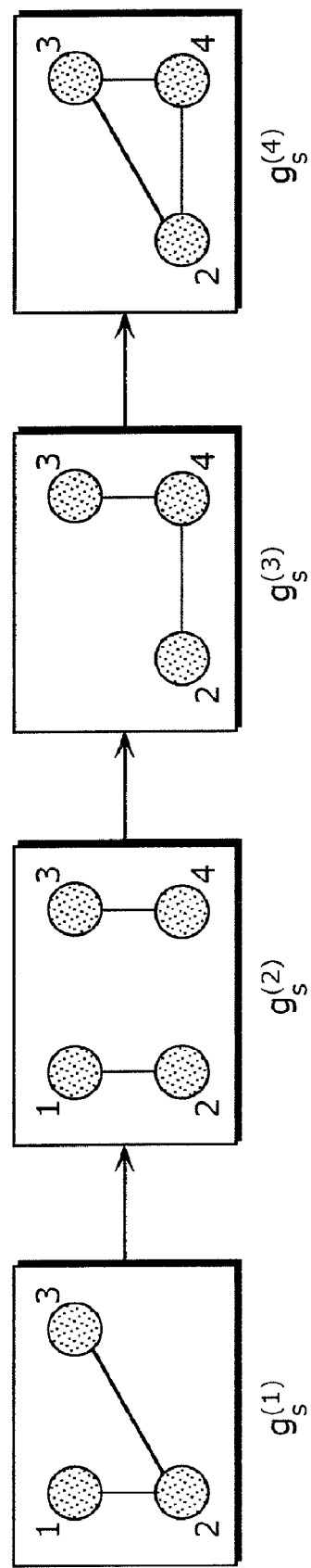
FIG. 6 is a diagram showing an example of an output pattern.

As described in the preceding section, the changes in the graphs can be expressed using the operators. The commutative properties of these operators have been described as well. Before explaining the pattern enumeration algorithm in detail, the conception is first described using specific examples. It should be noted that the pattern enumeration processing is performed by the subsequence candidate generation unit 20 and the appearance frequency calculation unit 22 included in the extraction unit 18. One of the output patterns is shown in FIG. 6, and this pattern is represented as follows.

[Math. 42]

$$g^{(4)} = OP_{[ei,(2,3),-]}^{(3)} OP_{[ei,(2,4),-]}^{(2)} OP_{[vd,1,red]}^{(2)} \quad (1)$$
$$OP_{[ed,(1,2),-]}^{(2)} OP_{[ed,(2,3),-]}^{(1)} OP_{[ei,(3,4),-]}^{(1)} OP_{[vi,4,red]}^{(1)} OP_{[ei,(2,3),-]}^{(0)}$$
$$OP_{[ei,(1,2),-]}^{(0)} OP_{[vi,3,blue]}^{(0)} OP_{[vi,2,blue]}^{(0)} OP_{[vi,1,red]}^{(0)} \perp$$

Figure 7:
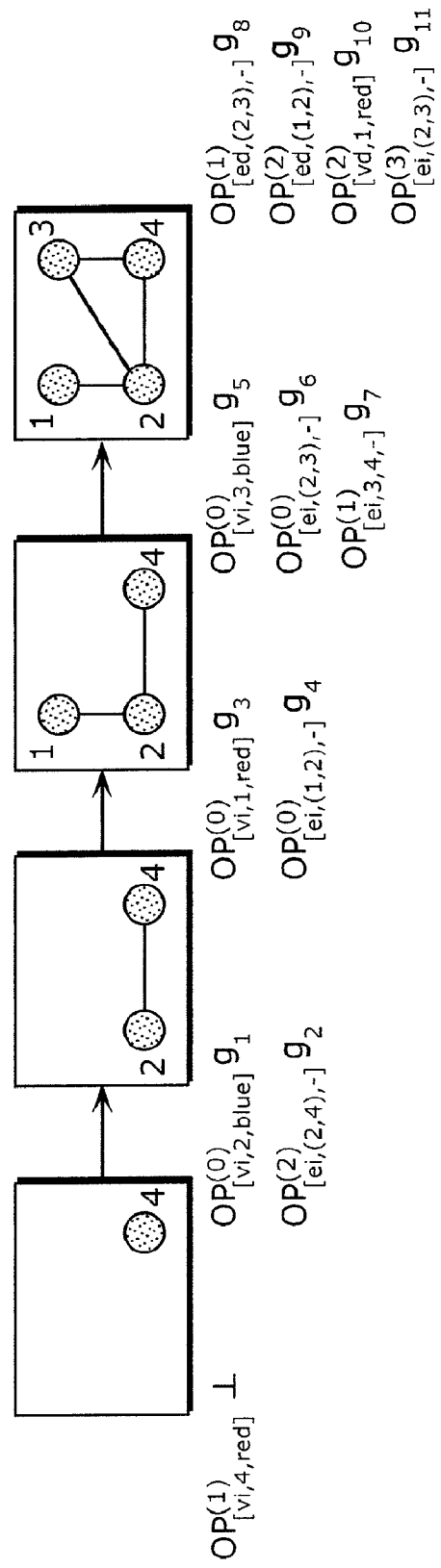
FIG. 7 is a diagram showing an example of graph sequence representation of Table 3.

Table 2 shows the operators corresponding to the applications. Consideration is given to the case where the order of these operators is changed within a commutative limit. Table 3 shows one example of changing the order, and this order change is represented in FIG. 7. As can be seen from FIG. 7, the graph is gradually expanded by making the insertions of one vertex and edges connecting to this vertex as one set. The original changing graph sequential pattern (1) can be obtained by rearranging the operators in the order of application.

TABLE 2

Transformation Operator Representation of FIG.

| | |
|---|---|
| 1 | $g_1^{(0)} = OP_{[vi,1,red]}^{(0)} \text{bot}$ |
| | $g_2^{(0)} = OP_{[vi,2,blue]}^{(0)} g_1^{(0)}$ |
| | $g_3^{(0)} = OP_{[vi,3,blue]}^{(0)} g_2^{(0)}$ |
| | $g_4^{(0)} = OP_{[ei,(1,2),-]}^{(0)} g_3^{(0)}$ |
| | $g^{(1)} = OP_{[ei,(2,3),-]}^{(0)} g_4^{(0)}$ |
| 2 | $g_1^{(1)} = OP_{[vi,4,red]}^{(1)} g^{(1)}$ |
| | $g_2^{(1)} = OP_{[ei,(3,4),-]}^{(1)} g_1^{(1)}$ |
| | $g^{(2)} = OP_{[ed,(2,3),-]}^{(1)} g_2^{(1)}$ |
| 3 | $g_1^{(2)} = OP_{[ed,(1,2),-]}^{(2)} g^{(2)}$ |
| | $g_2^{(2)} = OP_{[vd,1,red]}^{(2)} g_1^{(2)}$ |
| | $g^{(3)} = OP_{[ei,(2,4),-]}^{(2)} g_2^{(2)}$ |
| 4 | $g^{(4)} = OP_{[ei,(2,3),-]}^{(3)} g^{(3)}$ |

Figure 8:
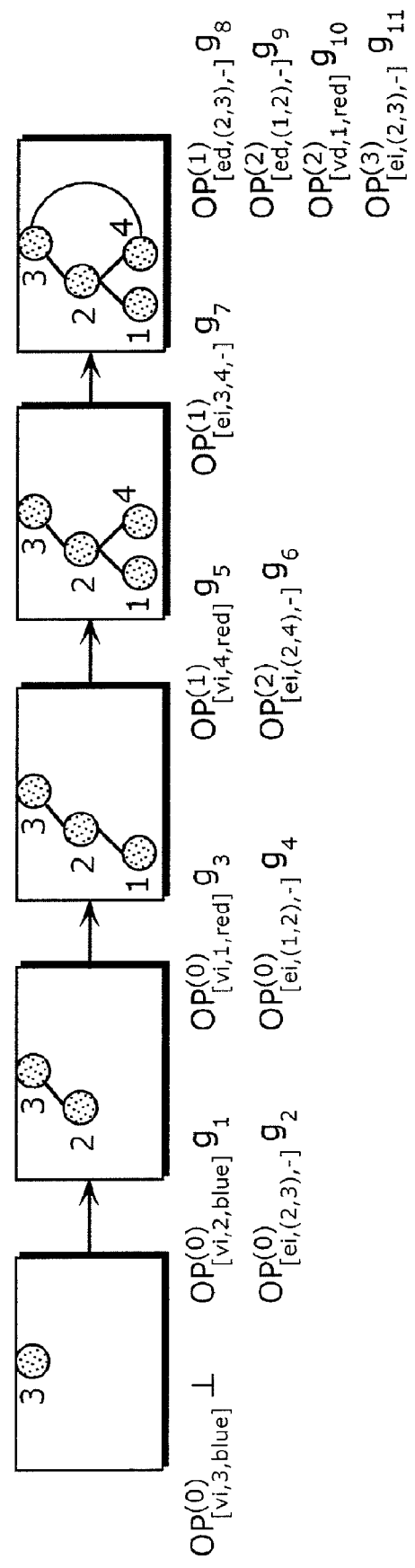
FIG. 8 is a diagram showing an example of graph sequence representation of Table 4.

On the other hand, Table 4 and FIG. 8 show a method of expanding the graph by making the insertion of one edge or the insertions of one edge and one vertex as one set. Let attention be focused only on the growth of the topology alone where the application order t and the like are ignored. In this case, the former is a pattern growth approach according to the AcGM algorithm (see Non-Patent Reference 3, for example) (although both the AcGM and FSG algorithms are based on the "candidate generate and test" approach instead of the pattern growth approach, the term "pattern growth" is used here for both of them). The latter is a pattern growth approach according to the gSpan algorithm (see Non-Patent Reference 10, for example). Moreover, according to a different order of operators, it is possible for the pattern to grow from a path, then to a free tree, and then to a graph in this order, as in the case of the Gaston algorithm (see Non-Patent Reference 7, for example). As described thus far, the proposed method is highly versatile whereby various kinds of existing frequent graph mining methods can be integrated through the change in the order of operators.

A scaffold sequence s' of s in the transformation operator sequence representation is defined.

Suppose that $t_1 < t_2$ and $o_1 = o_2$ in the following expression.

$$OP_{[*,o_1,l_1]}^{(t_1)}, OP_{[*,o_2,l_2]}^{(t_2)} \in s \quad [\text{Math. 43}]$$

In this case, s' is defined as a subsequence of s.

Here, the sequence s is configured by the following.

$$OP_{[*,o_1,l_1]}^{(t_1)} \quad [\text{Math. 44}]$$

The operators from $g_1$ to $g_8$ in Table 3 and the operators from $g_1$ to $g_8$ in Table 4 form the respective scaffold sequences.

TABLE 3

Change in Transformation Operators of Table 2

| | |
|---|---|
| 1 | $g_1 = OP_{[vi, 4, red]}^{(1)} \perp$ |
| 2 | $g_2 = OP_{[vi, 2, blue]}^{(0)} g_1$ |
|   | $g_3 = OP_{[ei, (2, 4), -]}^{(0)} g_2$ |
| 3 | $g_4 = OP_{[vi, 1, red]}^{(0)} g_3$ |
|   | $g_5 = OP_{[ei, (1,2), -]}^{(0)} g_4$ |
| 4 | $g_6 = OP_{[vi, 3, blue]}^{(0)} g_5$ |
|   | $g_7 = OP_{[ei, (2, 3), -]}^{(0)} g_6$ |
|   | $g_8 = OP_{[ei, (3, 4), -]}^{(1)} g_7$ |
| 5 | $g_9 = OP_{[ed, (2, 3), -]}^{(1)} g_8$ |
| 6 | $g_{10} = OP_{[ed, (1, 2), -]}^{(2)} g_9$ |
| 7 | $g_{11} = OP_{[vd, 1, red]}^{(2)} g_{10}$ |
| 8 | $g_{12} = g^{(4)} = OP_{[ei, (2, 3), -]}^{(3)} g_{11}$ |

<Theorem 3> When a correspondence relation between the pattern s in the transformation operator sequence representation and its scaffold sequence s' is φ, the following is satisfied.

$$\{OP_{[*,o,l]}^{(t)} \in s, \nexists OP_{[*,o',l']}^{(t')} \in s' \text{ s.t } OP_{[*,o,l]}^{(t)} = \phi(OP_{[*,o',l']}^{(t')})\} \subseteq$$
$$\{\phi(o') | OP_{[*,o',l']}^{(t')} \in s'\}$$

[Math. 45]

<Theorem 4> A union graph of the pattern s in the transformation operator sequence representation is isomorphic to a union graph obtained from the scaffold sequence of the pattern s.

Accordingly, as one of the methods to obtain the frequent pattern s expressed in the transformation operator sequence representation, there is a method whereby the scaffold sequence s' of the pattern s is generated and then a transformation operator is inserted into s' for expansion without changing the union graph of s'. In fact, it can be understood that the operators subsequent to $g_9$ in Table 3 and the operators subsequent to $g_9$ in Table 4 expand the respective patterns without changing the union graphs of the scaffold sequences. Thus, an algorithm including the following two steps can be considered:

1. first enumerating all scaffold sequences of all patterns to be extracted; and 2. sequentially expanding the pattern by inserting an operator that is not included in the scaffold sequence, without changing the union graph of the scaffold sequence.

In the above step 1, an expand operation in the scaffold sequence s is described as "expand (s)".

TABLE 4

Change in Transformation Operators of Table 2 (2)

| | |
|---|---|
| 1 | $g_1 = OP_{[vi, 3, blue]}^{(0)} \perp$ |
| 2 | $g_2 = OP_{[vi, 2, blue]}^{(0)} g_1$ |
|   | $g_3 = OP_{[ei, (2, 3), -]}^{(0)} g_2$ |
| 3 | $g_4 = OP_{[vi, 1, red]}^{(0)} g_3$ |
|   | $g_5 = OP_{[ei, (1,2), -]}^{(0)} g_4$ |
| 4 | $g_6 = OP_{[vi, 4, red]}^{(1)} g_5$ |
|   | $g_7 = OP_{[ei, (2, 4), -]}^{(2)} g_6$ |
| 5 | $g_8 = OP_{[ei, (3, 4), -]}^{(1)} g_7$ |
| 6 | $g_9 = OP_{[ed, (2, 3), -]}^{(1)} g_8$ |
| 7 | $g_{10} = OP_{[ed, (1, 2), -]}^{(2)} g_9$ |
| 8 | $g_{11} = OP_{[vd, 1, red]}^{(2)} g_{10}$ |
| 9 | $g_{12} = g^{(4)} = OP_{[ei, (2, 3), -]}^{(3)} g_{11}$ |

<3. 1 Expansion of Scaffold Sequence>

Figure 9:
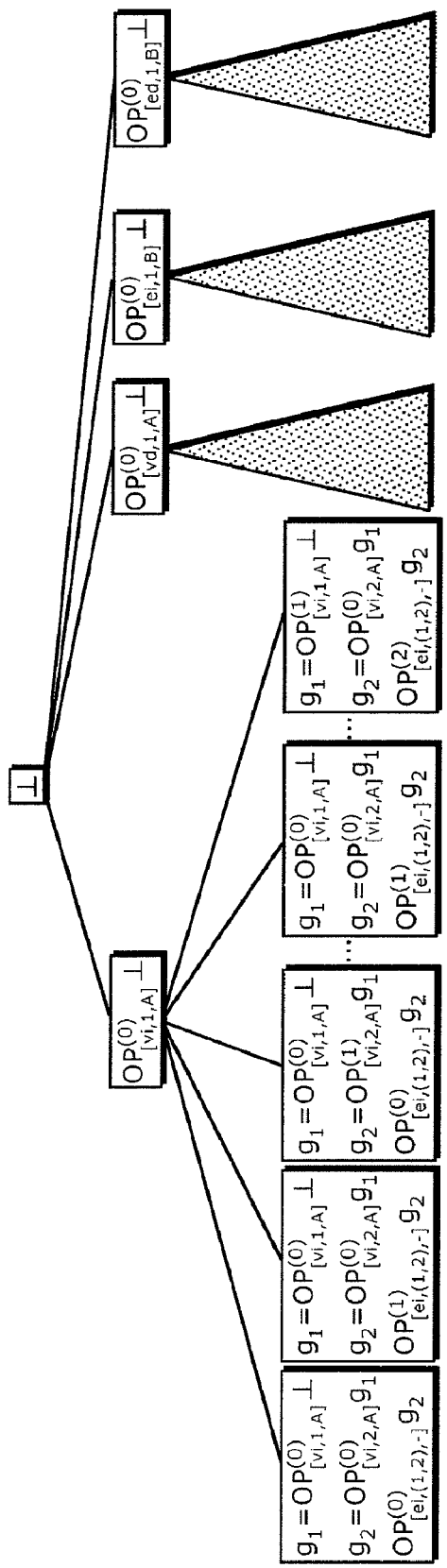
FIG. 9 is a diagram showing an example of a search tree.

FIG. 9 shows a part of a search tree in which a search is made for a scaffold sequence having two or fewer vertices in the union graph. Although triangles in the diagram indicate search spaces, detailed descriptions are omitted due to space limitation. The search for the scaffold sequence is made by the subsequence candidate generation unit 20 and the appearance frequency calculation unit 22. Suppose that there are two kinds of vertex labels A and B and one kind of edge label—, and that relabeling is not performed. The subsequence candidate generation unit 20 generates a pattern candidate with one vertex, and the appearance frequency calculation unit 22 calculates the number of appearances of the scaffold pattern. Thus, the search is first made for the pattern with one vertex. Here, as a child node of a root node in the search tree, a node is generated for each of all the scaffold patterns expressed as follows, that can exist with one vertex.

$$OP_{[vi, 1, A]}^{(0)}, OP_{[vd, 1, A]}^{(0)}, OP_{[vi, 1, B]}^{(0)}, OP_{[vd, 1, B]}^{(0)}$$ [Math. 46]

Note that the unique IDs of the vertices in the patterns are represented by integer values starting from 1.

$$OP_{[vi, 1, A]}^{(0)}$$ [Math. 47]

Next, the above pattern is expanded, so that its child node is generated. The pattern is expanded in such a manner that the union graph of the scaffold pattern is connected, instead of expanding the pattern so as to increase the application order t of the transformation operators. When the expansion method is based on the AcGM algorithm, a vertex and an edge associated with the vertex are inserted. When the expansion method is based on one of the FSG, gSpan, and Gaston algorithms, the pattern is expanded with an edge and a vertex associated with the edge. Here, the pattern is not expanded using a transformation operator that is already included in the scaffold sequence and has o.

Attention needs to be paid to the following patterns.

[Math. 48]

$$OP_{[ei, (1, 2), -]}^{(0)} OP_{[vi, 2, A]}^{(1)} OP_{[vi, 1, A]}^{(0)} \perp \quad (2)$$

$$OP_{[ei, (1, 2), -]}^{(2)} OP_{[vi, 2, B]}^{(0)} OP_{[vi, 1, A]}^{(1)} \perp \quad (3)$$

In the pattern (2), a vertex, where t=0, with the label A and the unique ID 1 is inserted and also an edge is inserted between a pair of vertices (1, 2). Then, in the subsequent pattern, a vertex, where t=1, with the label A and the unique ID 2 is inserted. From this information alone, since the edge (1, 2) is inserted before the vertex with the unique ID 2 is inserted, it seems impossible to insert the edge.

$$OP_{[vi, 2, A]}^{(2)} OP_{[vi, 2, A]}^{(1)} OP_{[ed, (1, 2), -]}^{(1)}$$
$$OP_{[ei, (1, 2), -]}^{(0)} OP_{[vi, 2, A]}^{(0)} OP_{[vi, 1, A]}^{(0)} \perp$$ [Math. 49]

However, when the above pattern frequently appears, the pattern (2) as the subsequence also frequently appears because of the anti-monotonicity of the support. For this reason, the pattern (2) needs to be enumerated as well.

The pattern (3) is generated by expanding the following.

$$OP_{[vi, 1, A]}^{(0)}$$ [Math. 50]

Here, the order in which the vertex with the unique ID 1 is inserted is changed.

$$OP_{[*, o, l]}^{(t)}$$ [Math. 51]

Here, t in the above operator of the pattern shows information of the order in which two operators are applied. Thus, attention needs to be paid to the fact that the order in which the operators in the pattern are applied is changed in this way as the pattern is expanded.

In the search tree, it is not always true that only one isomorphic pattern appears. For example, the following two sequences are isomorphic.

$$OP_{[ei,(1,2),-]}^{(0)}OP_{[vi,2,B]}^{(0)}OP_{[vi,1,A]}^{(0)}\perp$$

$$OP_{[ei,(1,2),-]}^{(0)}OP_{[vi,2,A]}^{(0)}OP_{[vi,1,B]}^{(0)}\perp \quad \text{[Math. 52]}$$

It is inefficient if the isomorphic patterns in different representations are repeatedly generated. In such a case, when a graph code that is generated from the union graph of the scaffold pattern and the unique IDs of the vertices in the union graph is a canonical code, the present pattern is left in the search space. The graph code depends on the algorithm, such as AcGM, gSpan, FSG, and Gaston, that is employed for expanding the scaffold pattern.

<3. 2 Pattern Expansion from Projection Data>

The scaffold sequence s is generated according to the method described in the preceding section. Then, as described in the present section, the sequence s is expanded by inserting an operator that is not included in the scaffold sequence, without changing the union graph of s. The pattern scaffold ends at $g_8$ in Table 3 and also at $g_8$ in Table 4. In the present section, the processing performed for $g_9$ and the subsequent operators is explained.

Suppose that a correspondence relation between a scaffold sequence s and data $(tid_i, d_i)$ including this sequence s is expressed as $\phi$. In this case, a projection function "project" is defined as follows.

$$\{(tid_i, d'_i)\} = \text{project}((tid_i, d_i), s) \quad \text{[Math. 53]}$$

Here, $d'_i$ satisfies the following.

$d'_i$ is a subsequence of $seq(d_i)$.

o' of $OP_{[*, o', l']}^{(t')} \in d'_i$ is included in $$\{o | OP_{[*, o, l]}^{(t)} \in d_i, OP_{[*, o_s, l_s]}^{(t_s)} \in s \text{ s.t. } OP_{[*, o, l]}^{(t)} = \phi$$
$$(OP_{[*, o_s, l_s]}^{(t_s)})\}. \quad \text{[Math. 54]}$$

When $OP_{[*, o', l']}^{(t')} \in d'_i$ exists in $OP_{[*, o, l]}^{(t)} \in d_i$, $OP_{[*, o_s, l_s]}^{(t_s)} \in s$ where o=o' and $OP_{[*, o, l]}^{(t)} = \phi (OP_{[*, o_s, l_s]}^{(t_s)})$, $t \leq t'$.

$d'_i$ has a maximal sequence length in order to satisfy the above.

EXAMPLE 3

Suppose that a scaffold sequence s and sequence data $d_i$ are expressed by the following equations respectively in the transformation operator sequence representation.

$$s = \langle OP_{[vi,1,A]}^{(1)} OP_{[vi,2,B]}^{(2)} OP_{[ei,(1,2),-]}^{(2)} OP_{[vi,3,C]}^{(3)} OP_{[ei,(2,3),-]}^{(3)} \rangle \quad \text{[Math. 55]}$$

$$seq(d_i) = \langle OP_{[vi,1,D]}^{(1)} OP_{[vi,2,A]}^{(1)} OP_{[ei,(1,2),-]}^{(1)} OP_{[vi,3,B]}^{(2)} OP_{[ei,(2,3),-]}^{(2)}$$
$$OP_{[ed,(2,3),-]}^{(3)} OP_{[ei,(1,3),-]}^{(3)} OP_{[ed,(1,2),-]}^{(4)} OP_{[vd,2,A]}^{(4)}$$
$$OP_{[vi,4,C]}^{(4)} OP_{[ei,(3,4),-]}^{(4)} OP_{[vi,2,B]}^{(5)} OP_{[ed,(3,4),-]}^{(5)} OP_{[ei,(1,4),-]}^{(5)} \rangle$$

Here, project $((tid_i, d_i), s)$ is expressed as follows.

[Math. 56]

$$\text{project}((tid_i, d_i), s) = \qquad (4)$$
$$\{(tid_i, \langle OP_{[vi,2,A]}^{(1)} OP_{[vi,3,B]}^{(2)} OP_{[ei,(2,3),-]}^{(2)} OP_{[ed,(2,3),-]}^{(3)} OP_{[vd,2,A]}^{(4)}$$
$$OP_{[vi,4,C]}^{(4)} OP_{[ei,(3,4),-]}^{(4)} OP_{[vi,2,B]}^{(5)} OP_{[ed,(3,4),-]}^{(5)} \rangle)\}$$

The sequence (4) is expressed as follows when the operators having the same application order t are parenthesized and t is thus removed.

$$\langle OP_{[vi,2,A]}(OP_{[vi,3,B]}OP_{[ei,(2,3),-]})OP_{[ed,(2,3),-]}$$
$$(OP_{[vd,2,A]}OP_{[vi,4,C]}OP_{[ei,(3,4),-]})(OP_{[vi,2,B]}$$
$$OP_{[ed,(3,4),-]})\rangle \quad \text{[Math. 57]}$$

Accordingly, the sequence can be assumed to be in the sequence representation of sequential pattern mining in which an operator is treated as an item. The following is generated from the input database and the scaffold pattern s.

$$DB'(s) = \{(tid_i, d'_i) | (tid_i, d_i) \in DB, (tid_i, d'_i) \in \text{project}((tid_i, d_i), s)\} \quad \text{[Math. 58]}$$

With the above being an input for the sequential pattern mining, the pattern can be sequentially expanded without changing the union graph of the scaffold sequence s.

<3. 3 Pseudo-Codes>

FIG. 10 shows pseudo-codes of the proposed method implemented by the frequent changing pattern extraction device 100. As inputs, a database DB which is a collection of sequence data and a support threshold σ' are given. In Line 7, the scaffold sequence is expanded. In Line 9, it is verified whether or not the scaffold sequence s is canonical. This corresponds to the processing of "if s=min(s)" of the pseudo-code according to the gSpan algorithm (see Non-Patent Reference 10, for example). In Line 15, the projection data is generated using the enumerated scaffold sequences. Then, according to the sequential pattern mining method, all the patterns each having a union graph isomorphic to the union graph of the scaffold sequence are enumerated. FIG. 10 shows a method of enumerating patterns according to the breadth-first search algorithm. Similarly, it is possible to design a method of enumerating patterns according to the depth-first search algorithm.

<4. Evaluation Experiment and Consideration>

An evaluation experiment was carried out for the method described up to the preceding section. The method was implemented in C++, and a personal computer (PC) with a 1.66-GHz Core Duo CPU and 1.5-GB memory was used. For the sequential pattern mining, the PrefixSpan algorithm (see Non-Patent Reference 8, for example) was used. Table 5 shows a summary of meanings and default values of parameters in artificial data used in the present experiment. Firstly, N number of labeled graphs each having an average of $|V_{avg}|$ vertices are generated. The vertex labels are determined according to equal probabilities from $L_v$ number of labels, and the existence probability of an edge between two vertices is determined according to $p_e$. This is a union graph of a basic pattern. Each basic pattern starts from the following.

$$\perp \quad \text{[Math. 59]}$$

Until the union graph of the operator sequence becomes isomorphic to the previously-generated union graph, the operator sequence of the basic pattern is generated by inserting a transformation operator one at a time. The operator is only for inserting or deleting a vertex or edge. A target vertex or edge is randomly selected, and whether to insert or delete the target is determined according to the probability $p_i$. In this way, |DB| number of graph sequences are generated.

Then, one basic pattern is written over each described below.

$$(tid_i, d_i) \in DB \quad \text{[Math. 60]}$$

TABLE 5

Default Values for Generating Experiment Data

| Parameter | Default Value |
| --- | --- |
| Insert selection probability of data | $p_i = 80\%$ |
| Insert selection probability of basic pattern | $p'_i = 50\%$ |
| Average number of unique IDs in basic pattern | $|V_{avg}| = 5$ |
| Average number of unique IDs in data | $|V'_{avg}| = 7$ |
| Number of vertex labels | $|L_v| = 5$ |
| Number of edge labels | $|L_e| = 1$ |
| Number of basic patterns | $N = 10$ |
| Number of data sets in DB | $|DB| = 10{,}000$ |
| Edge existence probability | $P_e = 20\%$ |
| Support threshold | $\sigma' = 10\%$ |

Figure 11:
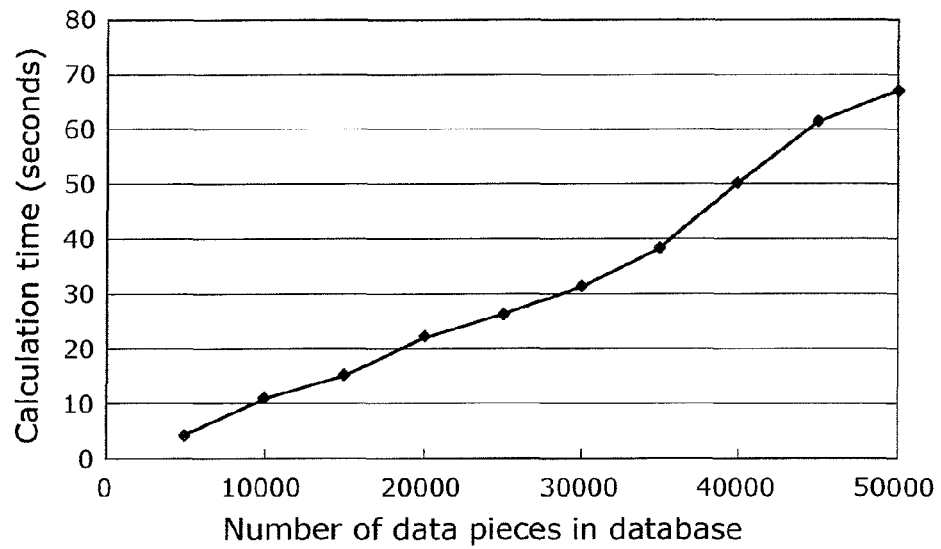
FIG. 11 is a diagram showing variations in the calculation time with respect to variations in |DB|.
Figure 12:
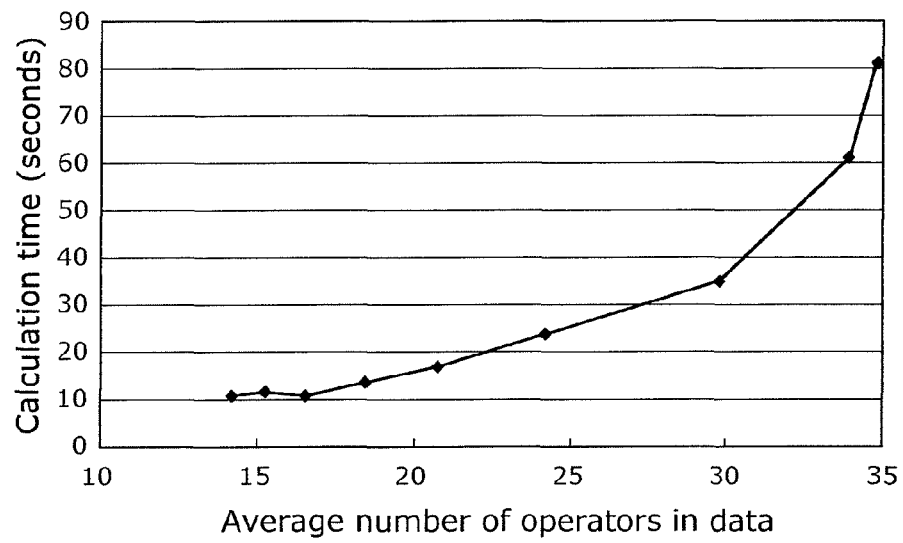
FIG. 12 is a diagram showing variations in the calculation time with respect to variations in $p'_t$.
Figures 13, 14:
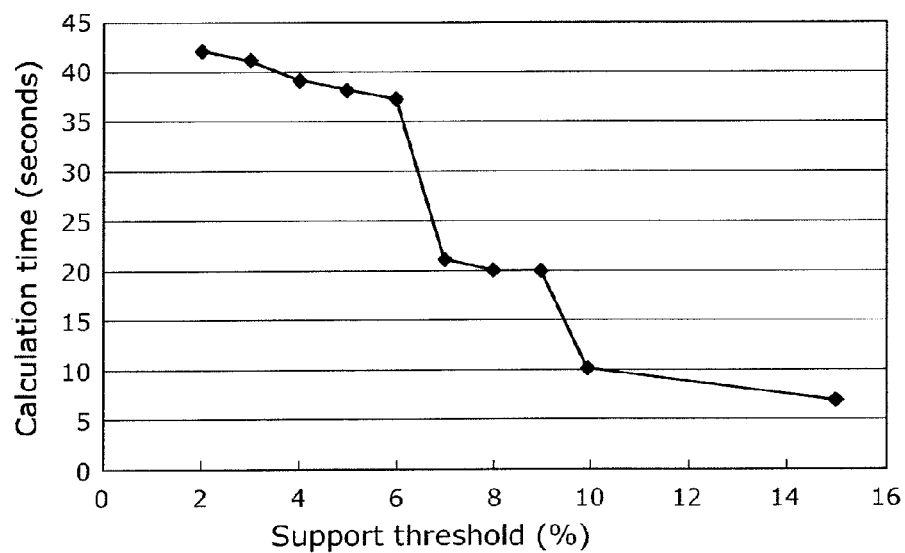
FIG. 13 is a diagram showing variations in the calculation time with respect to variations in $\sigma'$.
FIG. 14 is a diagram showing an example of data sets.
Figure 15:
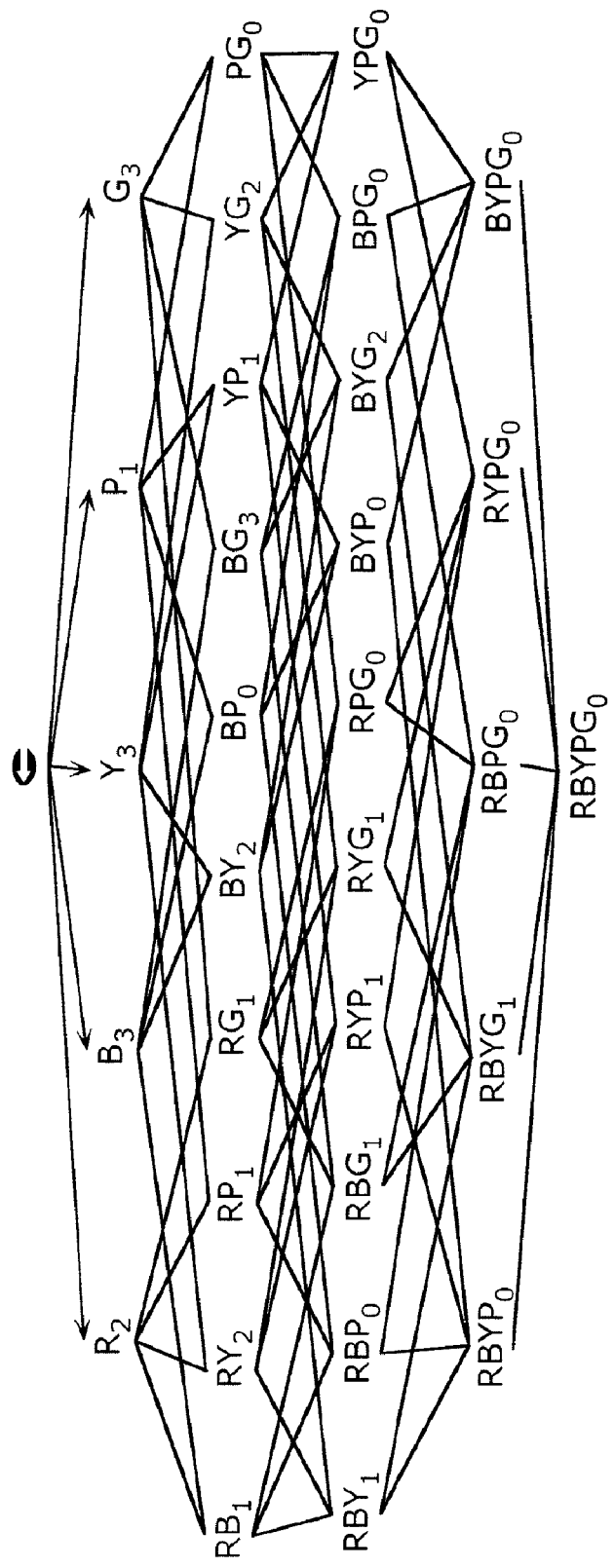
FIG. 15 is a diagram showing a search tree and a result of a search made through the search tree according to an exhaustive search algorithm.
Figure 16:
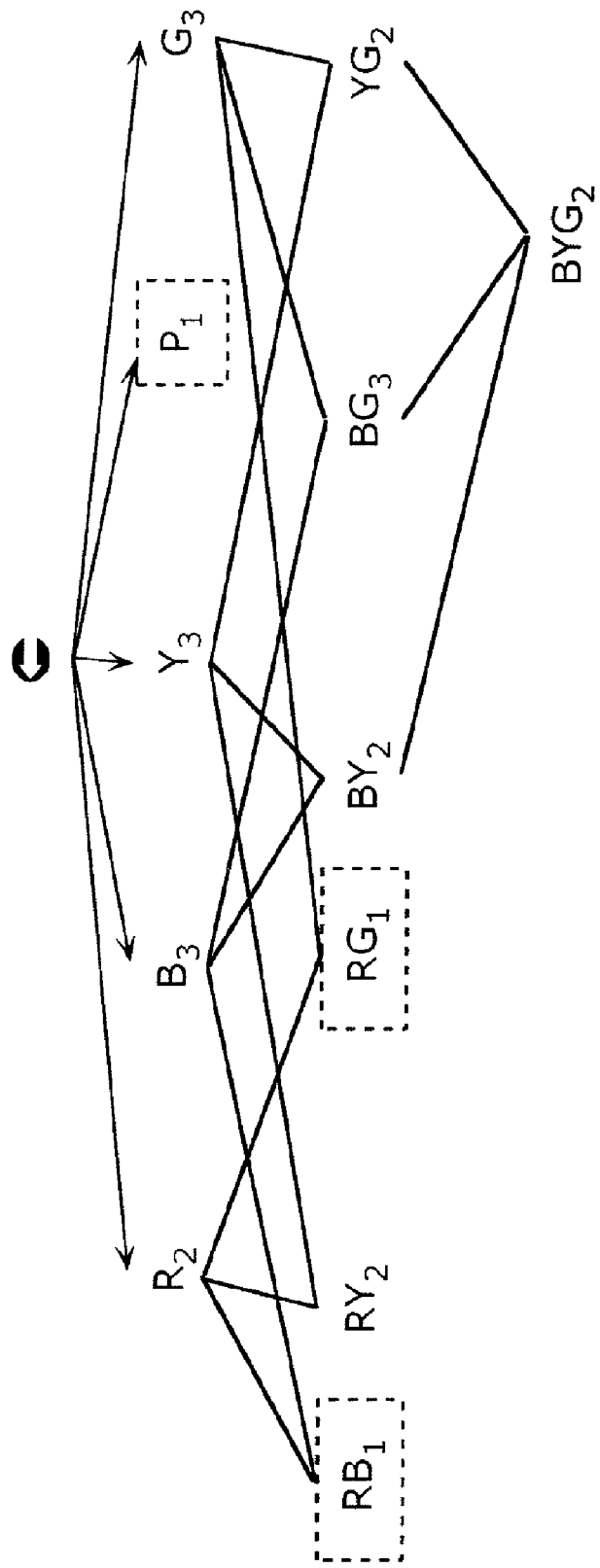
FIG. 16 is a diagram showing a result of a search made according to the Apriori algorithm.

Some of the results are shown in FIGS. 11 to 13. FIG. 11 shows variations in the calculation time with respect to variations in |DB|. It can be seen that the calculation time is proportional to an increase in the number of data pieces. FIG. 12 shows variations in the calculation time with respect to variations in $p'_i$. Note that the horizontal axis denotes the average number of operators in the sequences. As $p'_i$ decreases, the average number of operators increases and the calculation time increases in an exponential manner. FIG. 13 shows variations in the calculation time with respect to variations in $\sigma'$. As $\sigma'$ decreases, the calculation time increases.

As described thus far, the present invention proposes a method of enumerating readable frequent changing graph sequential patterns that are included in labeled graph sequences. Since the graph transformation operations are defined and the order in which the operations are applied is changed, the patterns can be enumerated with efficiency. Moreover, the evaluation experiment was carried out for the proposed method using the artificial data, and the variations in calculation time different depending on the data characteristics were shown.

The present invention allows the graph changes to be expressed using the operators. Thus, the changes in graphs (i.e., network structure) can be represented by an operator sequence. Based on the anti-monotonicity used in the Apriori algorithm, a frequent operator subsequence can be extracted. Since the operator sequence represents the changes in graphs, a frequent pattern of change in the graphs can be extracted.

Moreover, a graph which is not connected to a union graph is considered difficult for people to interpret. On account of this, a graph which is not connected to a union graph is removed, so that only the operator sequences included in the union graph become the targets in the processing. As a result, only operator subsequences (the patterns of change in the graphs) which are useful to people can be accordingly extracted. Furthermore, the number of operator sequences to be evaluated by the extraction unit can be reduced, and therefore the processing can be performed at high speed.

Also, the order changing unit 16 changes the order in which the operators are applied, thereby making it easier to apply the anti-monotonicity used in the Apriori algorithm.

The above embodiment describes a case where the changing graph sequence storage unit 10 stores a plurality of graph sequences. However, note that the changing graph sequence storage unit 10 may store only one graph sequence. In such a case, the frequent changing pattern extraction device 100 extracts an operator subsequence which appears at least a predetermined number of times in one operator sequence converted from one graph sequence.

Applications of such a frequent changing pattern extraction device include analyzing e-mail messages. For example, a graph $g^{(t)}$ is generated, in which a vertex corresponds to a person (namely, an e-mail address) and an edge corresponds to a connection between e-mail addresses between which e-mail messages have been exchanged. By analyzing the e-mail messages with such a graph being a start point, it is possible to extract a person who is going to be a hub in a community.

The embodiment disclosed thus far only describes an example in all respects and is not intended to limit the scope of the present invention. It is intended that the scope of the present invention not be limited by the described embodiment, but be defined by the claims set forth below. Meanings equivalent to the description of the claims and all modifications are intended for inclusion within the scope of the following claims.

INDUSTRIAL APPLICABILITY

The present invention can be applied to a frequent changing pattern extraction device which extracts a pattern of change frequently appearing in a network structure that changes from moment to moment. In particular, the present invention can be applied to, for example: a drug-discovery support device which supports drug discovery by extracting a pattern of change frequently appearing in changes in genetic structure; and an executive-candidate discovery support device which supports discovery of executive candidates by extracting a common pattern of change in human relations occurring to persons who are going to become hubs in a human relation network.

The invention claimed is:

1. A frequent changing pattern extraction device comprising:
   a processor;
   a conversion unit configured to convert, using said processor, a graph sequence into an operator sequence by expressing changes, from a first graph included in the graph sequence to a second graph which is temporally adjacent to the first graph, using operators indicating operations necessary to transform the first graph into the second graph, the graph sequence including a plurality of graphs that show temporal changes in the graphs, and each of the graphs including a vertex corresponding to a data piece and an edge corresponding to a link between data pieces; and
   an extraction unit configured to extract an operator subsequence that appears at least a predetermined number of times in the operator sequence, based on anti-monotonicity used in the Apriori algorithm,
   wherein there are a plurality of graph sequences,
   wherein said conversion unit is configured to convert each of the plurality of graph sequences into an operator sequence by expressing changes, from a first graph included in the graph sequence to a second graph which is temporally adjacent to the first graph, using operators indicating operations necessary to transform the first graph into the second graph, and
   wherein said extraction unit is configured to extract an operator subsequence that appears at least the predetermined number of times in the operator sequences corresponding to the plurality of graph sequences, based on the anti-monotonicity used in the Apriori algorithm.

2. The frequent changing pattern extraction device according to claim 1, wherein the operations indicated by the operators include at least one of a vertex insertion, a vertex deletion, a vertex relabeling, an edge insertion, an edge deletion, and an edge relabeling.

3. The frequent changing pattern extraction device according to claim 1, further comprising
a sequence-for-union-graph generation unit configured to generate an operator sequence corresponding to a union graph obtained by removing a vertex that is not connected to another vertex from a graph configured by a union of vertices and a union of edges of the plurality of graphs included in the graph sequence,
wherein said extraction unit is configured to extract an operator subsequence that appears at least a predetermined number of times in the operator sequence generated by said sequence-for-union-graph generation unit, based on the anti-monotonicity used in the Apriori algorithm.

4. The frequent changing pattern extraction device according to claim 1, further comprising
an order changing unit configured to change an order in which the operators included in the operator sequence converted by said conversion unit are arranged, so that the temporal changes in the graphs expressed by a resulting operator sequence are represented by vertices that increase in number over time,
wherein said extraction unit is configured to extract an operator subsequence that appears at least a predetermined number of times in the operator sequence obtained as a result of the order change executed by said order changing unit, based on the anti-monotonicity used in the Apriori algorithm.

5. The frequent changing pattern extraction device according to claim 1,
wherein said extraction unit includes:
a subsequence candidate generation unit configured to generate operator subsequence candidates while increasing the number of included operators by one each time; and
an appearance frequency calculation unit configured to calculate the number of appearances, in the operator sequence, for each of the operator subsequence candidates,
wherein said subsequence candidate generation unit is configured to increase the number of operators by one for only an operator subsequence candidate, out of the operator subsequence candidates, whose number of appearances calculated by said appearance frequency calculation unit is a predetermined number of times or more, so as to update the operator subsequence candidates.

6. A frequent changing pattern extraction method comprising:
Converting, using a processor, a graph sequence into an operator sequence by expressing changes, from a first graph included in the graph sequence to a second graph which is temporally adjacent to the first graph, using operators indicating operations necessary to transform the first graph into the second graph, the graph sequence including a plurality of graphs that show temporal changes in the graphs, and each of the graphs including a vertex corresponding to a data piece and an edge corresponding to a link between data pieces; and
extracting an operator subsequence that appears at least a predetermined number of times in the operator sequence, based on anti-monotonicity used in the Apriori algorithm,
wherein there are a plurality of graph sequences,
said conversion unit is configured to convert each of the plurality of graph sequences into an operator sequence by expressing changes, from a first graph included in the graph sequence to a second graph which is temporally adjacent to the first graph, using operators indicating operations necessary to transform the first graph into the second graph, and
wherein said extraction unit is configured to extract an operator subsequence that appears at least the predetermined number of times in the operator sequences corresponding to the plurality of graph sequences, based on the anti-monotonicity used in the Apriori algorithm.

7. A non-transitory computer readable recording medium having stored thereon a program, wherein, when executed, the program causes a computer to execute a method comprising:
converting a graph sequence into an operator sequence by expressing changes, from a first graph included in the graph sequence to a second graph which is temporally adjacent to the first graph, using operators indicating operations necessary to transform the first graph into the second graph, the graph sequence including a plurality of graphs that show temporal changes in the graphs, and each of the graphs including a vertex corresponding to a data piece and an edge corresponding to a link between data pieces; and
extracting an operator subsequence that appears at least a predetermined number of times in the operator sequence, based on anti-monotonicity used in the Apriori algorithm,
wherein there are a plurality of graph sequences,
wherein said converting converts each of the plurality of graph sequences into an operator sequence by expressing changes, from a first graph included in the graph sequence to a second graph which is temporally adjacent to the first graph, using operators indicating operations necessary to transform the first graph into the second graph, and
wherein said extracting extracts an operator subsequence that appears at least the predetermined number of times in the operator sequences corresponding to the plurality of graph sequences, based on the anti-monotonicity used in the Apriori algorithm.

* * * * *